United States Patent [19]

Takemasa et al.

[11] Patent Number: 5,167,883
[45] Date of Patent: Dec. 1, 1992

[54] METHOD FOR REDUCING THE QUANTITY OF SILOXANE OLIGOMER IN ORGANOPOLYSILOXANE MOLDINGS

[75] Inventors: Takao Takemasa; Masaru Kobayashi; Mitsuo Hamada, all of Chiba, Japan

[73] Assignee: Dow Corning Toray Silicone Company, Ltd., Tokyo, Japan

[21] Appl. No.: 634,271

[22] Filed: Dec. 26, 1990

[30] Foreign Application Priority Data

Dec. 28, 1989 [JP] Japan ................................. 1-343089

[51] Int. Cl.$^5$ ............................................. B29C 71/00
[52] U.S. Cl. ........................................ 264/28; 264/83; 264/85; 264/344
[58] Field of Search ..................... 264/331.11, 28, 83, 264/85, 344; 101/457

[56] References Cited

U.S. PATENT DOCUMENTS 4,308,799 1/1982 Kitagawa et al. ................... 101/457

FOREIGN PATENT DOCUMENTS 3323940 1/1985 Fed. Rep. of Germany .
52-29305 3/1977 Japan ................................. 101/457
56-109788 8/1981 Japan ................................. 101/457
8402291 6/1984 PCT Int'l Appl. .

OTHER PUBLICATIONS

European Search Report, dated Aug. 27, 1991, for European Application No. 90 12 5696.
Supercritical Fluids, Yilgor et al., Polymer Bulletin 12, (1984) pp. 491–497.

Primary Examiner—Jan H. Silbaugh
Assistant Examiner—Brian J. Eastley
Attorney, Agent, or Firm—Roger H. Borrousch

[57] ABSTRACT

A method of improving the efficient depletion of the siloxane oligomer present in organopolysiloxane moldings by using supercritical carbon dioxide gas, so that this reduction in siloxane oligomer content is accomplished without cracking of the moldings by regulating the pressure reduction to less than 40 Kg/cm$^2$ per 1 hour during the release to atmospheric pressure.

1 Claim, No Drawings

METHOD FOR REDUCING THE QUANTITY OF SILOXANE OLIGOMER IN ORGANOPOLYSILOXANE MOLDINGS

BACKGROUND OF THE INVENTION

1. Technical Field

The present invention relates to a method for reducing the content of siloxane oligomer which is present in organopolysiloxane moldings.

2. Prior Art

Organopolysiloxane moldings consist of moldings made of silicone resins, as well as, moldings made of silicone rubbers such as heat-vulcanizing silicone rubbers, silicone rubbers which cure at room temperature under the influence of moisture, and addition reaction-curing silicone rubbers. These assume a large number of configurations in accordance with the particular application, such as films, sheets, plates, massive or bulk configurations, spherical forms, microparticulate configurations, laminates, and so forth. Regardless of the nature of the curing reaction, these moldings typically contain some level of siloxane oligomer. It has become clear that this siloxane oligomer exercises adverse effects in a wide variety of the applications of these moldings, and demand has arisen for the removal of this siloxane oligomer.

Evaporative procedures are the most common prior art methods for the removal of the siloxane oligomer in organopolysiloxane moldings. These have consisted of removing the siloxane oligomer by executing a high-temperature stripping treatment in vacuo at the level of the organopolysiloxane prior to production of the molding.

For example, Japanese Patent Application Laid Open [Kokai or Unexamined] Number 63-44681 [44,681/88], published Feb. 25, 1988, discloses a silicone rubber fixer roll which contains less than 0.2 weight % low-molecular-weight siloxane with vapor pressure $\geq 10$ mmHg at 200° C. This is achieved by an in vacuo heat treatment of the organopolysiloxane prior to molding.

Zosel in U.S. Pat. No. 3,969,196, issued Jul. 13, 1976, teaches a method of separating various mixtures of organic compounds in liquid or solid state by contacting the mixture with a gas maintained under supercritical conditions of temperature and pressure, separating the gas in the form of an identifiable gas phase loaded with a compound taken up during contact of the mixture by the gas, and thereafter separating the compound from the gas.

PROBLEM TO BE SOLVED BY THE INVENTION

However, such an evaporative procedure can remove siloxane oligomer having at most approximately 10 silicon atoms. In the case of the long-term service of, for example, a fixer roll produced from organopolysiloxane depleted of siloxane oligomer by such an evaporative procedure, the relatively high-molecular-weight siloxane oligomer (approximately 11 to 25 silicon atoms) will still gradually bleed to the surface, which results in blurred copies and contaimination of the equipment.

SUMMARY OF THE INVENTION

The present invention takes as its object the introduction of a facile method for reducing the content in organopolysiloxane moldings of siloxane oligomer having up to approximately 25 silicon atoms.

MEANS SOLVING THE PROBLEM AND FUNCTION THEREOF

The present invention relates to an improvement in a method comprising contacting an organopolysiloxane molding with supercritical or subcritical carbon dioxide in order to reduce said molding's content of siloxane oligomer, forming a gas phase mixture of the supercritical or subcritical carbon dioxide and the siloxane oligomer, thereafter releasing the gas phase mixture and reducing the gas phase mixture to atmospheric pressure, and recovering an organopolysiloxane molding with a siloxane oligomer content of less than 0.20 weight %, the improvement comprising reducing the quantity of siloxane oligomer to less than 0.20 weight % where said siloxane oligomer has a vapor pressure at 200° C. of $\geq 10^{-5}$ mmHg to less than 10 mmHg in the organopolysiloxane molding by regulating the pressure drop at a rate not exceeding 40 kg/cm² per 1 hour during the pressure release to atmospheric pressure which is conducted after execution of contact treatment with supercritical or subcritical carbon dioxide within the pressure range of 75 to 400 kg/cm² and the temperature range of 0° C. to 250° C.

DETAILED DESCRIPTION OF THE PREFERRED EMBODIMENTS

Organopolysiloxane moldings within the scope of the present invention may consist of the silicone rubbers known in the art, such as heat-vulcanizing silicone rubbers, silicone rubbers which cure at room temperature under the influence of moisture, addition reaction-curing silicone rubbers, and so forth, regardless of the vulcanization mechanism. Also encompassed are organopolysilsesquioxanes and the silicone resins used, for example, as semiconductor sealants and coatings. These moldings may take any configuration, for example, film, sheet, plate, bulk or massive configurations, spherical forms, microparticulate configurations, laminates, and so forth.

The silicon-bonded organic groups in the organopolysiloxane forming the basis for these moldings comprise alkyl groups such as methyl, ethyl, butyl, hexyl, and octyl; alkenyl groups such as vinyl, allyl, and hexenyl; aryl groups such as phenyl, etc.; and substituted hydrocarbon groups such as 3,3,3-trifluoropropyl. The hydroxyl group or alkoxy group may also be bonded to silicon in this organopolysiloxane.

Other than this base component, one may select among and deploy the following components which are generally employed in the production of silicone rubbers and silicone resins: curing agents such as organoperoxides, organohydrogenpolysiloxanes, and hydrolyzable group-containing organosilanes or organopolysiloxanes; fillers such as fumed silica, quartz micropowder, and calcium carbonate; as well as platinum-type compound hydrosilylation catalysts, condensation catalyst, reaction inhibitors, plasticizers, heat stabilizers, flame retardants, colorants, and so forth.

The supercritical gas extraction art used by the present invention is in fact already known, as shown by Zosel which is hereby incorporated by reference to show a method of using supercritical gas extraction. As a particular matter, carbon dioxide is most often used for the following reasons: it is nontoxic and inexpensive; it is relatively easily made into a supercritical gas because it has a critical temperature of 31° C. and a critical pressure of 75 kg/cm$^2$; and separation of the extract is facilitated because carbon dioxide is a gas at atmospheric pressure.

With regard to the state of the carbon dioxide within the context of the present invention, it is advisable and desirable that it be a supercritical gas with a pressure of at least 75 kg/cm$^2$ and a temperature of at least 31° C., but it will not make a difference even if it is a subcritical gas with a temperature below 31° C. and a pressure of at least 75 kg/cm$^2$.

On the subject of the pressure, the density of the carbon dioxide gas increases and the siloxane oligomer solubility increases as the pressure increases, and this makes it possible to remove the higher-molecular-weight siloxane oligomer. At the same time, certain disadvantages arise when the pressure is increased more than is necessary, such as a substantial increase in equipment costs and the failure of the siloxane oligomer solubility to increase to the corresponding degree. For these reasons, the maximum value is optimally 400 kg/cm$^2$.

With regard to the temperature, both the density of the carbon dioxide gas and the siloxane oligomer solubility decline as the temperature increases, while the diffusion coefficient of the gas increases. As a result, its rate of penetration into the molding is increased, and the extraction rate undergoes an even larger increase. However, thermal degradation of the molding sets in at temperatures in excess of 250° C. and the original properties of the molding will be lost. Accordingly, the temperature range of 0° C. to 250° C. is advisable.

Execution of the herein described contact treatment between supercritical or subcritical carbon dioxide and organopolysiloxane moldings results in the gradual dissolution of the siloxane oligomer in the molding into the carbon dioxide gas. The final residual quantity of oligomer in the molding depends on such factors as the initial quantity of siloxane oligomer in the molding, the thickness of the molding, the efficiency of contact between the molding and carbon dioxide, and so forth. In fundamental terms, as one increases the quantity of carbon dioxide used for treatment relative to the weight of the molding, the residual quantity of siloxane oligomer in the molding approaches zero asymptotically. However, from the standpoint of efficiency, it will be sufficient to halt the contact treatment when values below 0.20 weight % are reached for the quantity of siloxane oligomer with vapor pressure at 200° C. of from $\geq 10^{-5}$ mmHg to less than 10 mmHg.

Furthermore, after contact between the organopolysiloxane molding and the supercritical or subcritical carbon dioxide, it is essential that the pressure be dropped at a rate not exceeding 40 kg/cm$^2$ per 1 hour when the pressure is released to atmospheric pressure. When the pressure is dropped at a rate in excess of 40 kg/cm$^2$ per 1 hour, fissuring or cracking may be produced by the abnormal stresses generated within the molding when the carbon dioxide which has penetrated into the molding rapidly expands and escapes from the molding. Dropping the pressure at a rate not exceeding 40 kg/cm$^2$ per 1 hour satisfactorily accounts for the stresses and stress changes generated within the molding and makes possible the removal of the siloxane oligomer without changing the form or morphology of the molding.

The method of the present invention can efficiently remove the siloxane oligomer present in organopolysiloxane moldings, including the siloxane oligomer having up to approximately 25 silicon atoms which is so difficult to remove by evaporative procedures. As a particular consequence of this, siloxane oligomer bleed out will not occur even in the face of long-term use in such applications as fixer rolls, etc., and the life of the fixer roll will be lengthened and the copy count will be sharply increased. In addition, organopolysiloxane moldings afforded by the present invention are strongly qualified for applications which are averse to siloxane oligomer bleed out, for example, applications associated with printing, coating, or adhesion on organopolysiloxane moldings.

The following examples are illustrative of the present invention which is delineated in the claims. In these examples, parts=weight parts and %=weight % unless otherwise stated.

EXAMPLES 1-4

100 Parts organopolysiloxane gum composed of 99.84 mole % dimethylsiloxane units and 0.16 mole % methylvinylsiloxane units (degree of polymerization=5,000, preliminarily depleted of siloxane oligomer by heating its thin film in vacuo), 5 parts hydroxyl-terminated dimethylpolysiloxane (viscosity=10 centistokes), and 25 parts fumed silica with a specific surface area of 200 m$^2$/g (Aerosil 200) were mixed and kneaded to homogeneity. This was then heated for 2 hours at 150° C. to afford a base compound. 1.5 Parts 2,4-dichlorobenzoyl peroxide was added to 100 parts of this base compound, and this was mixed and kneaded to homogeneity on a two-roll mill to prepare a silicone rubber composition. This composition was molded into a 6 mm-thick sheet at a pressure of 50 kg/cm$^2$ for 10 minutes at 170° C. (primary vulcanization). This was followed by a secondary vulcanization by heating for 4 hours at 200° C.

Six mm-thick silicone rubber sheet (30 g each) obtained as above was placed in a pressure vessel, which was pressurized with carbon dioxide using a compressor, and an extraction treatment was carried out using supercritical carbon dioxide or subcritical carbon dioxide under the conditions reported in the Table.

The carbon dioxide-extracted silicone rubber sheet was cut into small pieces and extracted with solvent, and this was analyzed by gas chromatography (GC-9AF from Shimadzu Seisakujo) in order to measure the quantity of siloxane oligomer having a vapor pressure of at least 10 mmHg at 200° C. as well as the quantity of siloxane oligomer having a vapor pressure (at 200° C.) below 10 mmHg but $\geq 10^{-5}$ mmHg. These results are reported in the Table.

The comparison examples involved measurement of the quantity of siloxane oligomer in the case of a rapid pressure release, in the organopolysiloxane gum which had not been treated with supercritical carbon dioxide, and in the silicone rubber after primary vulcanization and after secondary vulcanization. These results are also reported in Table 1.

One notes that a major amount of the siloxane oligomer is removed by heating the organopolysiloxane gum in vacuo, primary vulcanization, and secondary vulcanization, but one also notes that depletion to below 0.20 weight % was almost impossible. In particular, the removal of siloxane oligomer with vapor pressure (at 200° C.) below 10 mmHg but $\geq 10^{-5}$ mmHg by this approach is highly problematic, but depletion to below 0.20 weight % was easily achieved by extraction with supercritical carbon dioxide. Moreover, in the case of a rapid rate of pressure release, while there was a tendency for the quantity of siloxane oligomer to be reduced, cracking was produced in the silicone rubber molding, which argues for a pressure release rate of no more than 40 kg/cm² per 1 hour.

TABLE 1

| | CO₂ treatment conditions | | | | Evaluation | | |
|---|---|---|---|---|---|---|---|
| | pressure kg/cm² | temperature °C. | CO₂ treatment quantity N—L/g rubber | rate of pressure drop per 1 hour kg/cm² | quantity of oligomer with vapor pressure at 200° C. ≧ 10 mmHg % | quantity of oligomer with vapor pressure at 200° C. less than 10 mmHg but ≧ 10⁻⁵ mmHg % | condition of silicone rubber sheet |
| Example 1 | 200 | 40 | 1310 | 12 | 0.018 | 0.166 | excellent |
| Example 2 | 200 | 40 | 2870 | 17 | 0.016 | 0.089 | excellent |
| Example 3 | 200 | 40 | 3880 | 5 | 0.019 | 0.164 | excellent |
| Example 4 | 100 | 20 | 4790 | 8 | 0.013 | 0.107 | excellent |
| Comparison Example 1 | 200 | 40 | 780 | 2400 | 0.004 | 0.026 | production of cracks |
| Comparison Example 2 | 200 | 40 | 1040 | 200 | 0.006 | 0.179 | production of cracks |
| Comparison Example 3 (after secondary vulcanization) | — | — | — | — | 0.020 | 0.640 | — |
| Comparison Example 4 (after primary vulcanization) | — | — | — | — | 0.635 | 1.152 | — |
| Comparison Example 5 (gum) | — | — | — | — | 1.409 | 1.208 | — |

EFFECTS OF THE INVENTION

The method of the present invention makes possible the efficient depletion of the siloxane oligomer present in organopolysiloxane moldings, which is responsible for a wide variety of ill effects. In particular, it makes possible the efficient depletion of siloxane oligomer having a vapor pressure (at 200° C.) of from ≧10⁻⁵ mmHg to less than 10 mmHg which is intractable to removal by evaporative procedures, that is, relatively high-molecular-weight siloxane oligomer having up to approximately 25 silicon atoms. This reduction in siloxane oligomer content is accomplished without cracking of the moldings by regulating the pressure reduction to less than 40 Kg/cm² per 1 hour during the release to atmospheric pressure.

That which is claimed is:

1. In a method comprising contracting an organopolysiloxane molding with supercritical or subcritical carbon dioxide in order to reduce said molding's content of siloxane oligomer, forming a gas phase mixture of the supercritical or subcritical carbon dioxide and the siloxane oligomer, thereafter releasing the gas phase mixture and reducing the gas phase mixture to atmospheric pressure, and recovering an organopolysiloxane molding with a siloxane oligomer content of less than 0.20 weight %, the improvement comprising reducing the quantity of siloxane oligomer having 11-25 silicone atoms to less than 0.20 weight % where said siloxane oligomer has a vapor pressure at 200° C. of from >10⁻⁵ mmHg to less than 10 mmHg in the organopolysiloxane molding by regulating the pressure drop at a rate not exceeding 40 kg/cm² per 1 hour during the pressure release to atmospheric pressure which is conducted after execution of contact treatment with supercritical or subcritical carbon dioxide within the pressure range of 75 to 400 kg/cm² and the temperature range of 0° C. to 250° C.

* * * * *